(12) United States Patent  
Mackin (10) Patent No.: US 7,837,149 B2
(45) Date of Patent: Nov. 23, 2010

(54) WING DEBRIS DETECTOR

(75) Inventor: Steven G. Mackin, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 819 days.

(21) Appl. No.: 11/756,423

(22) Filed: May 31, 2007

(65) Prior Publication Data

US 2010/0012785 A1    Jan. 21, 2010

(51) Int. Cl.
*B64D 15/20*    (2006.01)
(52) U.S. Cl. .................. 244/134 F; 244/214; 73/170.26
(58) Field of Classification Search .................. 244/1 R, 244/134 F, 134 R, 214; 73/802, 170.26
See application file for complete search history.

(56) References Cited

U.S. PATENT DOCUMENTS

| 2,566,813 | A | * | 9/1951 | Thorsen ....................... 340/962 |
| 4,553,137 | A | * | 11/1985 | Marxer et al. ................ 340/582 |
| 4,833,660 | A | * | 5/1989 | Deom et al. .................. 367/157 |
| 7,000,871 | B2 | * | 2/2006 | Barre et al. ............... 244/134 F |

* cited by examiner

*Primary Examiner*—Timothy D Collins
(74) *Attorney, Agent, or Firm*—Yee & Associates, P.C.; Dennis R. Plank (57) ABSTRACT

An apparatus and method for wind debris detection comprises a spring loaded probe that is deployed on the leading edge of an aircraft wing into an area where debris formation might impact wing aerodynamic performance. The probe travel is sensed by sensors (angular displacement, linear displacement, proximity, torque, load cell on spring, and the like), and if the sensor(s) detect that probe travel is limited then presence of debris is indicated.

23 Claims, 5 Drawing Sheets

WING DEBRIS DETECTOR

TECHNICAL FIELD

Embodiments of the subject matter described here relate generally to aviation. More particularly, the embodiments relate to the detection of wing fouling on an aircraft.

BACKGROUND

The leading edge of an aircraft wing can be fouled by various kinds of debris such as ice, snow, and mud. Accretions can form on the ground while waiting to take off, or when the aircraft flies, for example, through freezing rain and drizzle. Ice can rapidly form on wings when planes fly through clouds of cooled water droplets. The presence of the ice reduces wing aerodynamic performance.

Improvements in small airplane technology and the "hub and spoke" scheduling system used by the airline industry has resulted in many more commuter flights. Because commuter aircraft fly at lower altitudes, icing, dust, mud, and bird strike conditions are more likely to occur. Ice and other debris may accumulate on the wing close to the leading edge. Large jetliners generally use hot air from the engines to prevent ice from forming on the wings during flight, and use cleaning fluid (during washing) to remove ice and debris when on the ground. Smaller aircraft generally rely upon inflatable rubber "boots" along the wing leading edges to "pop" off accumulated ice and debris.

If ice or other debris is detected, it can be removed by the boots, heaters, or by washing. Accordingly, it is desirable to detect the presence of debris on the wing leading edge. Furthermore, other desirable features and characteristics of the techniques and technologies described herein will become apparent from the subsequent detailed description and the appended claims, taken in conjunction with the accompanying drawings and the foregoing technical field and background.

BRIEF SUMMARY

A system for wing debris detection comprises a probe on the leading edge of an aircraft wing, wherein the probe is deployed into an area where debris formation can impact wing aerodynamic performance. Certain embodiments described herein utilize kinematics and sensors to determine if debris has formed on the wing leading edge. After deployment, probe travel is sensed by one or more sensors (e.g., angular displacement, proximity, torque, load cell on spring, and the like), and if the sensor(s) detect that probe travel is limited then debris is indicated as being present.

In one embodiment, a system for detecting wing debris for an aircraft comprises a probe coupled directly or indirectly to the wing main element, a deployment mechanism coupled to the probe, a spring for limiting probe motion that is coupled to the probe and the deployment mechanism, and a sensor coupled to the probe and configured to measure motion of the probe. The system may also have a control mechanism for the probe coupled to the deployment mechanism and the sensor.

Another embodiment comprises a method for detecting wing debris using a wing debris detection system. The method begins by deploying the probe and detecting the position of the deployed probe. If the position of the probe is different from an expected position, then the presence of debris may be signaled.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the disclosure nor the application and uses of such embodiments. Furthermore, there is no intention to be bound by any expressed or implied theory presented in the preceding technical field, background, brief summary or the following detailed description.

Various system and method embodiments may be described herein in terms of functional and/or logical block components and various processing steps. It should be appreciated that such block components may be realized by any number of hardware, software, and/or firmware components configured to perform the specified functions. For the sake of brevity, conventional techniques and components related to signal processing, aircraft control systems, high lift devices, and other functional aspects of the systems (and the individual operating components of the systems) may not be described in detail herein. In addition, those skilled in the art will appreciate that embodiments of the present disclosure may be practiced in conjunction with a variety of different aircraft control systems and aircraft wing configurations, and that the system described herein is merely one example embodiment of the disclosure.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-7 and 9 depict example arrangements of elements, additional intervening elements, devices, features, or components may be present in an embodiment of the disclosure.

A wing is a surface used to produce lift and therefore allow flight, for travel in air or another medium. An example of an application in another non-air medium is a hydrofoil wing in water. The wing cross-sectional shape is usually an airfoil with a large lift-to-drag ratio. A common use for a wing is in flight, using forward motion to create vertical lift, but wings are also used to produce downward force holding racing cars on the ground. Furthermore, a sail boat moves by using sails and a keel like a vertical wing to produce lift in a horizontal direction. In this regard, although example embodiments described herein are in terms of the common use of aircraft flight, the embodiments of the disclosures are also applicable, without limitation, to a body capable of generating lift by moving through a fluid, as utilized in sail boats, hydrofoils, racing cars and the like.

Figure 1:
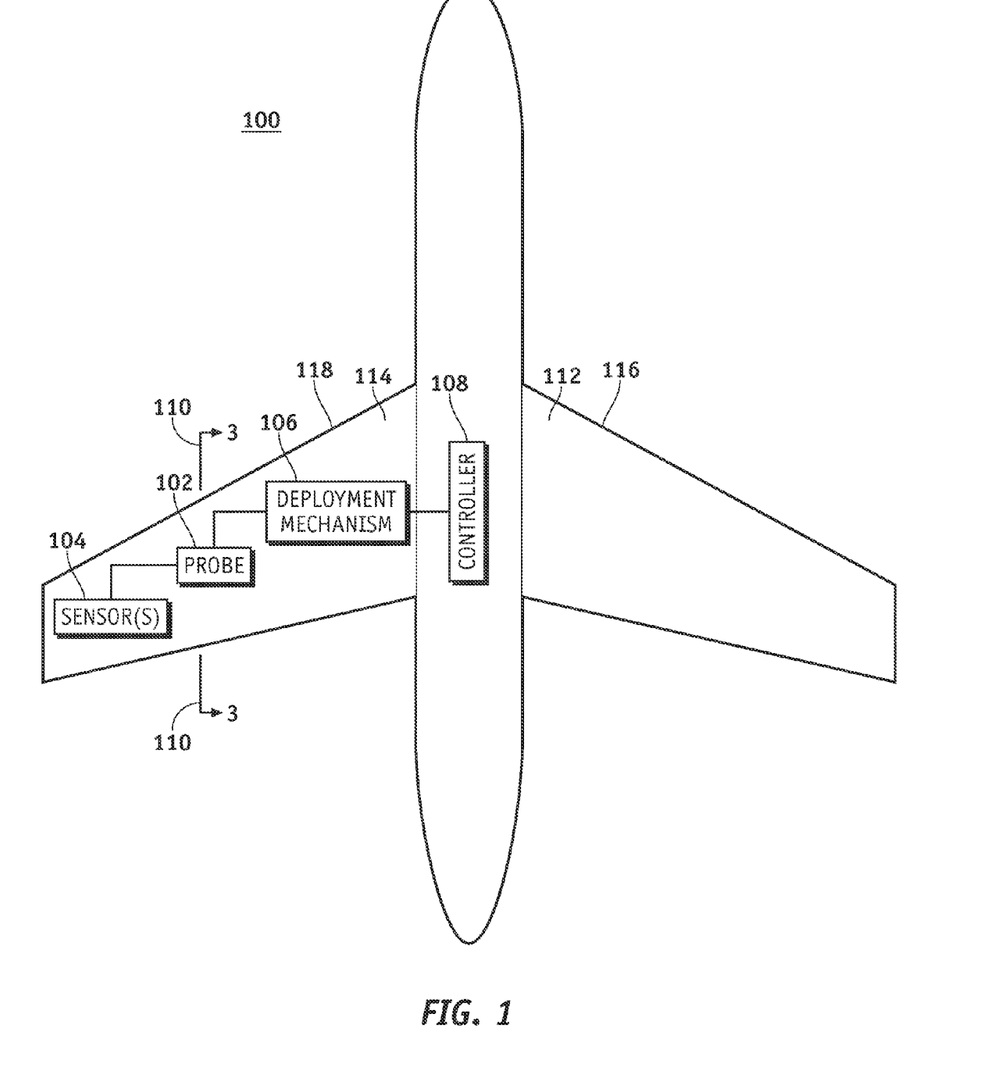
FIG. 1 illustrates a schematic top view of an aircraft showing a location on a wing where a probe may be mounted.

FIG. 1 depicts an aircraft 100 with wings 112/114. Each wing 112/114 has a leading edge 116/118 that corresponds to the fore direction of aircraft 100. Any debris (ice, mud, bird matter, etc.) that accumulates on the leading edge 116/118 of a wing 112/114 can impact the performance of the wing 112/114. This is especially important if a gapped Krueger flap is employed, which leaves a small opening between the flap and the wing leading edge 116/118, because debris could block air flowing through the gap. As used here, a Krueger flap is a leading edge flap that when deployed increases the lift and drag of the wing. The techniques and technologies described herein are utilized to detect material that has built up on the wing leading edge 112/114. The aircraft 100 comprises a wing debris detection system that may be located at any suitable location 110 along the wingspan (e.g., where a Krueger flap is deployed) according to an embodiment shown in FIG. 1. The wing debris detection system, which is only schematically depicted in FIG. 1, includes: a wing debris detection probe 102, a sensor or sensors 104, and a deployment mechanism 106. The system may also have a controller 108 for the probe coupled to the deployment mechanism 106 and the sensor 104. These components, which may be realized as hardware, software, firmware, processing logic, or any combination thereof, are described in detail below.

Figure 2:
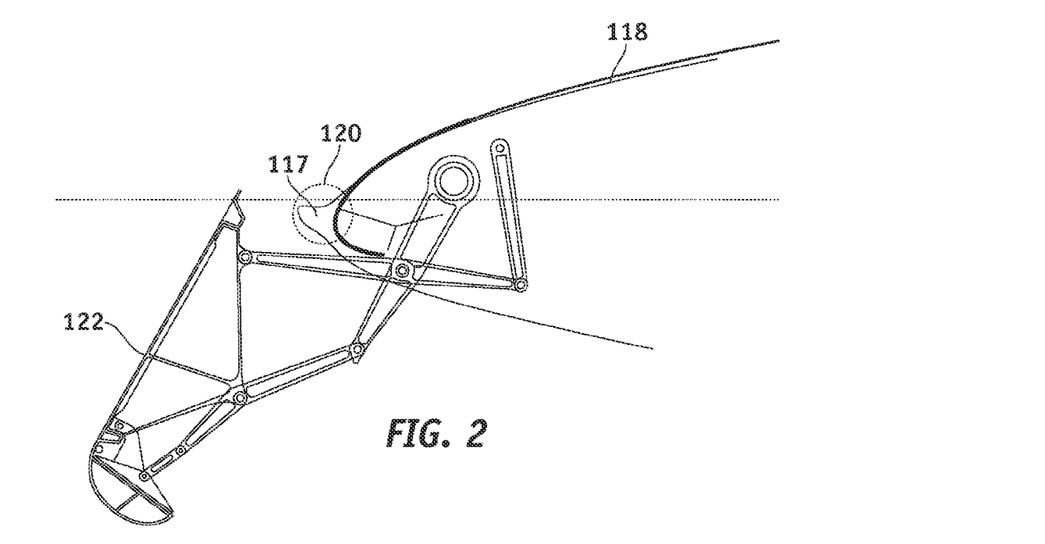
FIG. 2 illustrates a side cross sectional view of a portion of an aircraft wing showing a deployed Krueger flap and a wing leading edge where a probe may be mounted.

FIG. 2 illustrates a side view of a portion of an aircraft wing showing a deployed Krueger flap 122 and a wing leading edge 118. Flaps are surfaces hinged on the leading or trailing edge of an aircraft wing which, when deployed, increase the lift and drag of the wing. Flaps are usually fully extended while landing to allow the aircraft to fly more slowly by increasing the lift generated by the wing. Flaps are often partially extended for take-off to give the aircraft more lift without excessive drag when trying to leave the ground. Krueger flaps are hinged flaps on the leading edge.

Ice or debris may form on the leading edge of the wing because it is the first part of the wing to come in contact with water, ice, mud, bird matter, or other debris in the air. When debris such as ice builds up on aircraft wings, it increases drag, decreases lift, and can adversely affect performance. Icing has the potential to reduce the amount of lift produced by the wing and significantly increase stall speed. Ice that forms while an aircraft is grounded must be removed or allowed to melt before the aircraft takes off. Therefore, it is desirable to have systems and techniques for the detection of ice or other debris on the wings.

Figure 3:
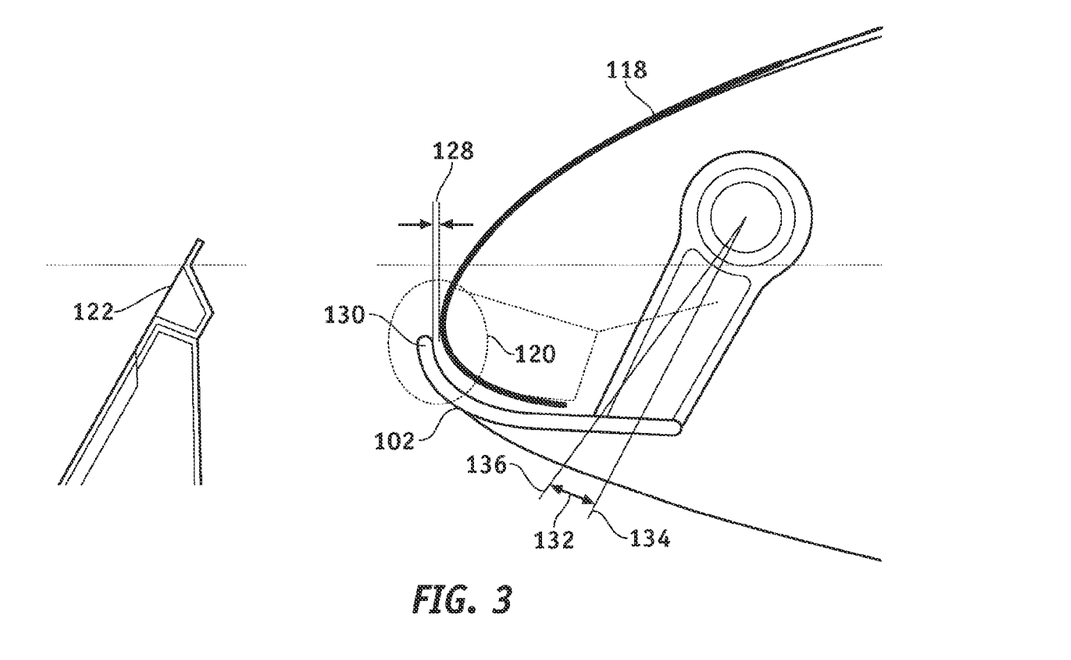
FIG. 3 illustrates an expanded side cross sectional view of a portion of an aircraft wing showing a deployed Krueger flap and a wing leading edge where a wing debris detection probe is mounted showing the minimum detection size.

When a forward flap such as a Krueger flap 122 is extended, its mounting slot 120 forms a gap that, according to an embodiment of the invention, may be used to mount a probe to detect ice such as accreted ice 117 (e.g., from a 30 minute hold in icing conditions) or other debris. FIG. 3 illustrates an expanded side view of a portion of an aircraft wing showing a deployed Krueger flap 122 and a wing leading edge 118 where a wing debris detection probe 102 is mounted showing the minimum detectable debris size 128. The wing debris detection probe 102 functions like a finger that is extended through slot 120, which is defined by the leading edge of the wing and the opposing surface or feature of the deployed Krueger flap 122. As described in more detail below, wing debris detection probe 102 is actuated with the intent to deploy it into a nominal (expected) position. This actuation causes wing debris detection probe 102 to extend, rotate, pivot, move, etc. to an area proximate to wing leading edge 118. Such actuation may occur, for example, during flight, before takeoff, in preparation for landing, when command by the pilot, etc. Upon deployment, if the wing debris detection probe 102 touches an obstacle on any part of its structure that blocks its deployment, the system assumes that debris is present.

Figure 4:
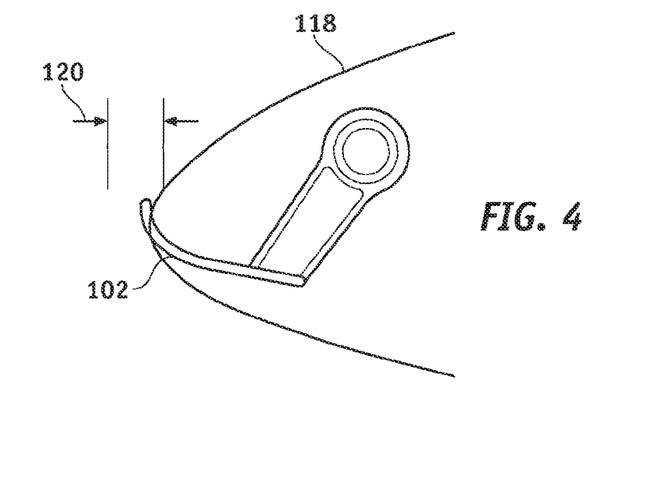
FIG. 4 illustrates a side cross sectional view of a portion of an aircraft wing showing a wing leading edge where a probe may be mounted showing no debris.
Figure 5:
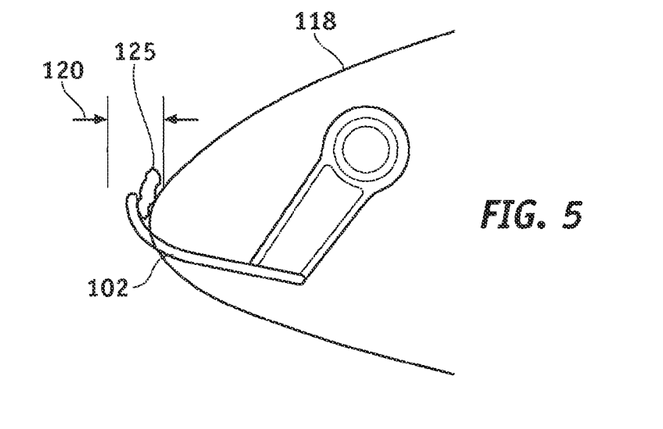
FIG. 5 illustrates a side cross sectional view of a portion of an aircraft wing showing a wing leading edge where a probe may be mounted showing minimum detectable size debris.
Figure 6:
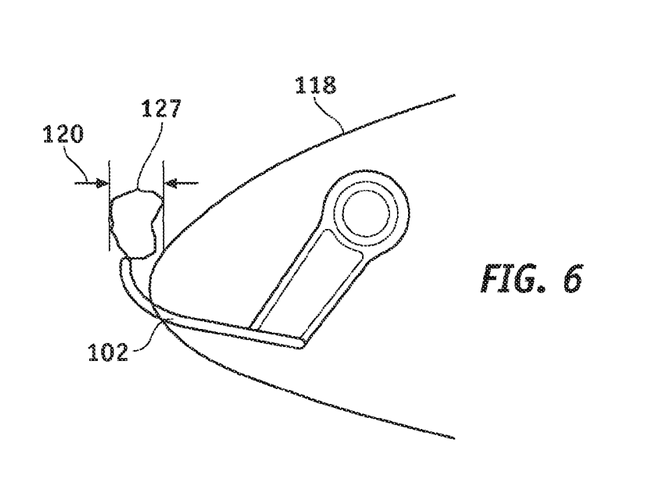
FIG. 6 illustrates a side cross sectional view of a portion of an aircraft wing showing a wing leading edge where a probe may be mounted showing large size debris.

Debris may be, without limitation, in the form of granular objects stuck to the wing such as mud, dirt, bird matter, or large sheets covering the wing surface such as ice built up on the wing leading edge 118. For example, FIGS. 4-6 illustrate a side cross sectional view of a portion of an aircraft wing showing a wing leading edge 118 where probe 102 is traveling through slot 120 and detecting no debris, relatively small size debris 125, and a relatively large size debris 127, respectively.

A wing debris detection probe 102 can detect the presence of debris when such debris interferes with the normal deployment of the wing debris detection probe 102. For example, if an ice sheet forms on the wing leading edge 118, and if the ice extends into the slot 120, then the wing debris detection probe 102 may detect the ice when the probe is being deployed because it will block deployment of the probe. When the wing debris detection probe 102 deploys, it will move up into the slot 120 towards a position it would have if no ice or other debris is present. Ice in the slot will block the motion, and stop the probe from reaching its intended position. Pressure on the probe tip 130 will also causes deviation or deflection 132 from the intended deployment angle 134. The position or angle of the probe if no debris is present is the intended or expected position or angle. Thus, debris can be detected, without limitation, if the position of the wing debris detection probe 102 is not the expected position, or the deployment angle 134 is not the expected deployment angle 136. The minimum detectable debris size 128 will be substantially equal to the distance between the side of the wing debris detection probe 102 and the wing leading edge 118. In one non-limiting embodiment, this minimum detectable debris size 128 is about 5 millimeters.

Figure 7:
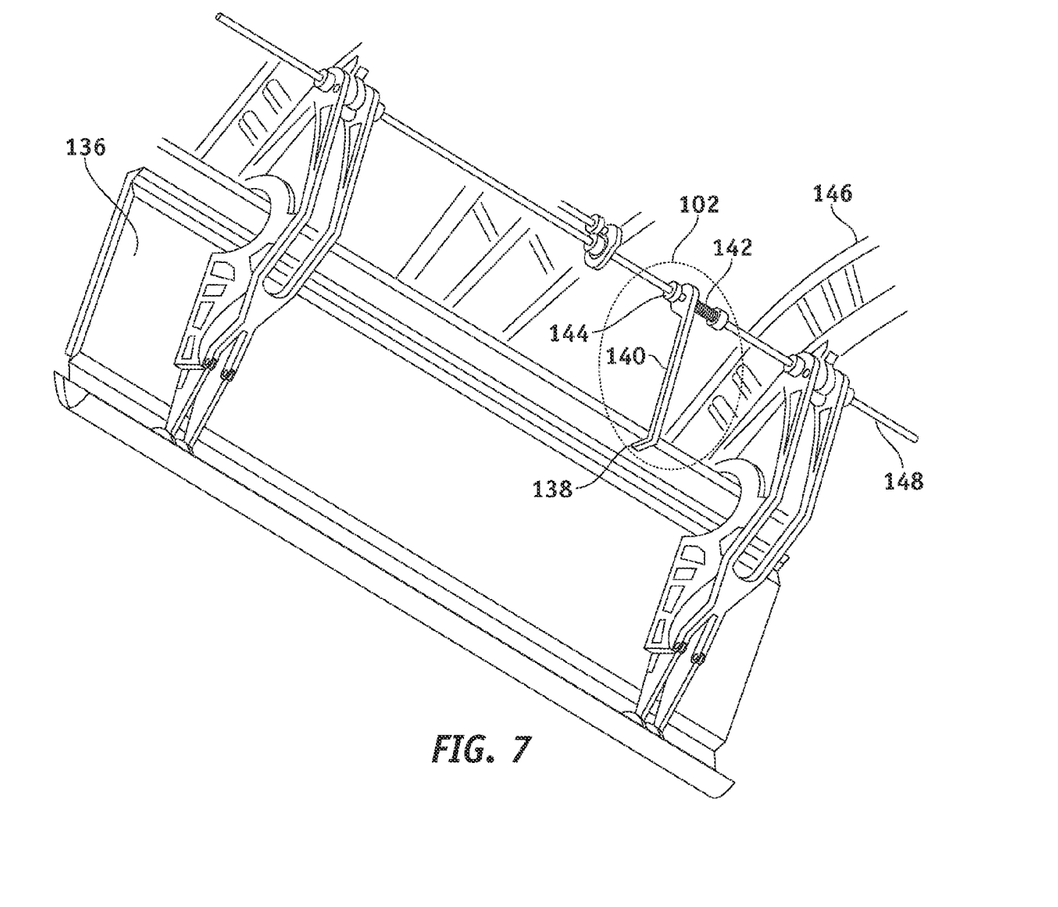
FIG. 7 is a perspective bottom view of a system for wing debris detection for an aircraft, showing a probe mounted and deployed on the pressure side of a flap.

FIG. 7 is a perspective bottom view of a wing debris detection system for an aircraft, showing a probe mounted and deployed on the pressure side of a flap. As shown here, wing debris detection probe 102 is coupled to the wing main element 146. A wing debris detection probe 102 may be of various shapes and sizes and may be mounted at various ways, but may generally include: a probe tip 138 or plurality of probe tips to make contact or proximity with the debris, a probe arm 140 to position the probe tip 138 at a proper position from the probe hinge 144, and a spring 142. In the example embodiment shown in FIG. 7, the probe hinge 144 is coupled to a Krueger flap shaft 148, which in turn is coupled to wing main element 146. The probe hinge 144 allows wing debris detection probe 102 to deflect from an intended angle to a degree limited by the spring 142. The spring 142 is coupled to the wing debris detection probe 102 and the deployment mechanism 106. The spring 142 may be a torsion spring twisted around the Krueger flap shaft 148. The spring 142 is nominally not deflected unless debris is present. In other words, spring 142 biases wing debris detection probe 102 against the leading edge of the wing (or against the debris).

Sensor 104 (see FIG. 1) is coupled to the probe and is configured to measure and indicate (i.e. as explained in more detail below) if the probe 102 is deflected from an intended position. In this regard, sensor 104 compares the measurement position to an expected debris-free position. Deflection may be sensed by a variety of sensors, sensing architectures comprising the controller 108 and the sensors 104, or sensing methods such as angular displacement, proximity, torque, load on the spring, or any like method for detecting pressure of the probe against debris accumulation on the wing leading edge, or angular deflection of the wing debris detection probe 102 from its intended angle. There may be one or more sensors, and the sensor or sensors may be located at various places on the wing debris detection probe 102, other parts of the wing main element 146 or devices coupled to the wing main element 146, or both. For example, the sensor 104 may be on the probe tip 138 to measure pressure, on the probe arm 140, on the wing main element 146 as a contact switch, or on the probe hinge 144 to measure angle of rotation of the hinge.

Deployment mechanism 106 is coupled to the wing debris detection probe 102, and deploys or stows the probe as needed. Deployment (i.e. explained in more detail below) is generally during takeoff and landing when the leading flaps are used and stowed so that at cruise conditions drag is minimized, but may be at other times during or before flight to test for debris. Deployment mechanism 106 also sets the deployment position, which may, without limitation, be a predetermined hinge angle corresponding to landing and approach flight conditions. For example, the probe angle may be, without limitation, about 20 degrees. Deployment mechanism 106 may be realized with actuators, a gear mechanism, and/or in conjunction with one or more components of the Krueger flap itself. In certain embodiments, the deployment mechanism 108 is electronically actuated and actively adjusted by controller 108. Any actuator known to those skilled in the art may be used for actuation of the wing debris detection system. For example, without limitation, a hydraulic actuator, a piezo-electric actuator, a spring loaded mechanism tied to flap deployment system, and the like.

The controller 108 may control the wing debris detection system. The controller 108 may be implemented as part of the aircraft system, a centralized aircraft processor, a subsystem computing module devoted to the wing debris detection system, or the like. The controller 108 may control the functions of probe deployment, monitoring sensors, and pilot notification. Moreover, the controller 108 might control deployment of the probe based on a current flight condition. This enables the controller 108 to control the actuation of the wing debris detection system at appropriate times, e.g., when the aircraft is approaching, landing, cruising, or parked. For this embodiment, controller 108 is configured to control the deployment of the wing debris detection probe 102 for a first set of flight conditions (such as landing and approach) to detect debris. The controller 108 also controls the stowing of the wing debris detection probe 102 for a second set of flight conditions (such as cruise). The controller 108 may include or be realized as an electronic processing module, a computer subsystem, or other computing element on the aircraft that is suitably configured to facilitate deployment of the wing debris detection probe 102. For example, the deployment angle for landing may be, without limitation, about 20 degrees.

Figure 8:
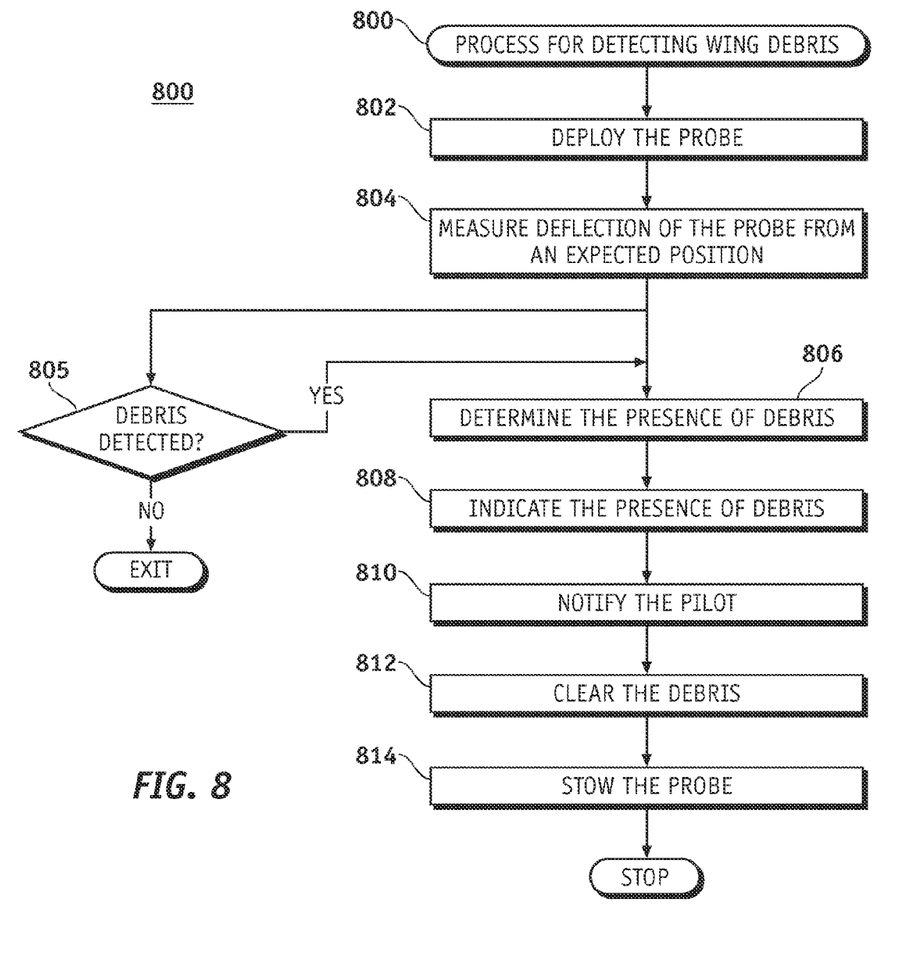
FIG. 8 is a flow chart illustrating a process for detecting wing debris using a deployable probe.

FIG. 8 is a flowchart illustrating a process 800 for detecting wing debris using a wing debris detection system such as that described above. Process 800, deploys a probe with the intent to achieve an expected position, detects deflection of the probe from the expected position, and based on deflection the probe deployment, indicates presence of debris. The various tasks performed in connection with process 800 may be performed by software, hardware, firmware, or any combination thereof. For illustrative purposes, the following description of process 800 may refer to elements mentioned above in connection with FIGS. 1-7. In practical embodiments, portions of process 800 may be performed by different elements of FIGS. 1-7 for detecting wing debris, e.g., the probe, the probe deployment mechanism and the control mechanism. Process 800 is described in terms of one of the example embodiments described herein, namely, deploying the probe and detecting wing debris.

Process 800 for detecting wing debris may begin by deploying the probe (task 802). FIGS. 3-6 illustrate a side cross sectional view of a portion of an aircraft wing showing a wing leading edge where a probe may be mounted showing the probe 102 in a deployed position. Deployment is generally during takeoff and landing when the leading edge flaps are used, but deployment may be at other times during or before flight as directed by the pilot or automatically to test for presence of debris. The probe may be deployed in conjunction with the Krueger flap to move the probe upon deployment of the Krueger flap such that the measurement tip of the probe extends between a gap formed between the Krueger flap and the leading edge, and to bias the measurement tip toward the leading edge until travel of the measurement tip is limited and the measurement tip reaches a measurement position. The probe may also be independently deployed such as at a time when the Krueger flap is currently deployed. The probe may be deployed in an attempt to achieve a predetermined hinge angle corresponding to landing and approach flight conditions. For example, the intended hinge angle may be about 20 degrees. If debris is present, the probe will not be able to achieve the predetermined hinge angle. The deployment force is generally not intended to displace the debris during the deployment, but the deployment force may be increased to clear the debris when necessary.

Process 800 may then measure any deflection of the probe from the expected position (task 804) by measuring the position of the probe after deployment is attempted, i.e., after its travel has been limited. A variety of sensors or sensing methods may be used to measure deflection such as, without limitation, the position of the probe, pressure on the probe by debris accumulation on the wing leading edge, and angular deflection of the probe from its intended angle. The deflection of the probe may also be measured by sensing, without limitation, angular displacement of the hinge from the expected position, proximity of the probe to the wing, torque on the hinge, load on the spring, pressure on the probe tip, distance between the probe arm and the wing main element, angle on the probe hinge, and the like. For example, a sensing architecture indicates the presence of debris on the leading edge when the measurement position deviates from the expected debris-free position by at least a threshold amount. If debris is not detected (query task 805) then process 800 exits.

However, if debris is detected, process 800 may then determine the presence of debris (task 806) if the probe position deviates from an intended position, and indicate the presence of debris (task 808). For example, if the sensor, sensors or sensor architecture detect that probe travel is limited then debris is present and, if not detected, the wing aerodynamic performance and thus the aircraft aerodynamic performance may be compromised to some degree. In this regard, the sensor, sensors or the sensing architecture indicates the presence of debris on the leading edge when the measurement position deviates from the expected debris-free position by at least a threshold amount. The threshold amount of angular displacement or the threshold amount of linear displacement is a function of the aerodynamic design and the sensitivities to debris. Generally the threshold amount may be about 0.25 degrees for the angular displacement, or may be about 0.1 inch for the linear displacement. If the debris is detected, process 800 may then notify the pilot (task 810), a ground crew member, an air traffic controller, etc. The notification may, for example, be via warning signals that may be displayed on the cockpit flight controls displays, alarm sounds and/or a light in the cockpit, and the like. Then, appropriate action may be taken (e.g., by the pilot or the ground crew) to clear the debris (task 812). Such action may be, to adjust aircraft aerodynamic performance limits by changing the aircraft speed, for example during landing and takeoff, or activate systems to remove the debris such as turning on a wing leading edge heater, using deicing or washing fluid, or cycling flaps.

Figure 9:
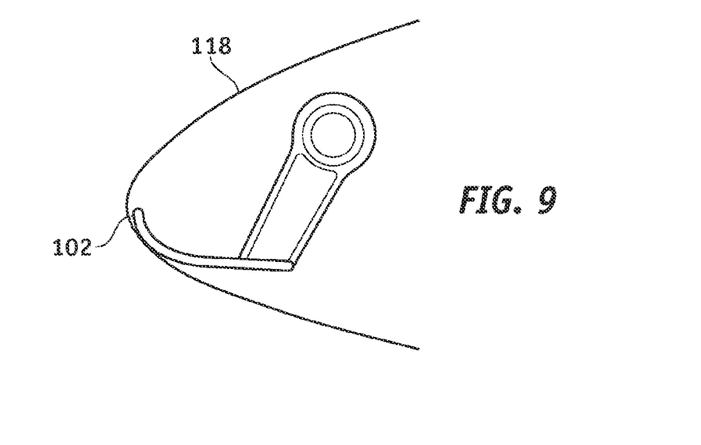
FIG. 9 illustrates a side cross sectional view of a portion of an aircraft wing showing a wing leading edge where a probe may be mounted showing the probe in a stowed position.

Process 800 may then stow the probe (task 814). FIG. 9 illustrates a side cross sectional view of a portion of an aircraft wing showing a wing leading edge where a probe may be mounted showing the probe 102 in a stowed position where the probe 102 is stowed inside the wing. The probe is generally stowed after takeoff or landing when the leading edge flaps are being stowed so that at cruise conditions drag is minimized, but the probe may be stowed at other times during or before flight as directed by the pilot or automatically when it is not needed or wanted. The probe may be stowed in conjunction with the Krueger flap or independently such as at a time after the Krueger flap is stowed.

With this approach, wing debris can be detected and cleared, or aircraft aerodynamic performance limits can be adjusted to compensate for presence of the wing debris.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. A system for detecting wing debris on an aircraft having a wing main element, the system comprising:
    a probe coupled to the wing main element;
    a deployment mechanism coupled to the probe and configured to deploy the probe around a leading edge of the wing main element; and
    a sensor coupled to the probe and configured to measure a deviation of the probe from an expected nominally deployed position.

2. The system according to claim 1, further comprising a controller coupled to the deployment mechanism and the sensor, wherein the controller is configured to control the probe.

3. The system according to claim 2, wherein the controller is further configured to:
    deploy the probe for a first set of flight conditions; and
    stow the probe for a second set of flight conditions.

4. The system according to claim 2, wherein the controller is further configured to determine presence of wing debris based upon the deviation.

5. The system according to claim 1, further comprising a spring coupled to the probe and the deployment mechanism, and configured to allow limited deflection of the probe from the expected position.

6. The system according to claim 5, wherein the sensor is further configured to measure load on the spring.

7. The system according to claim 1, wherein the sensor is further configured to measure if probe travel is limited.

8. The system according to claim 1, wherein the sensor is further configured to measure angular displacement of the probe.

9. The system according to claim 1, wherein the sensor is further configured to measure proximity between the probe and the wing debris.

10. The system according to claim 1, wherein the sensor is further configured to measure torque on the probe.

11. The system according to claim 1, further comprising a hinge for coupling the probe to the wing main element.

12. The system according to claim 10, wherein the sensor is further configured to measure angular displacement of the hinge.

13. The system according to claim 10, wherein the sensor is further configured to measure torque on the hinge.

14. A method for detecting wing debris on an aircraft having a wing main element and a probe coupled to the wing main element, the method comprising:
    deploying the probe in front of a leading edge of the wing main element;
    measuring a position of the probe; and
    indicating presence of wing debris if the position of the probe deviates from an expected position by at least a threshold amount.

15. The method according to claim 14, further comprising signaling presence of wing debris if the presence of debris is indicated.

16. The method according to claim 15, wherein the signaling further comprises notifying a pilot of the aircraft.

17. The method according to claim 14, wherein the deploying step is initiated by a pilot of the aircraft.

18. The method according to claim 14, wherein the deploying step is initiated automatically in response to a flight condition of the aircraft.

19. The method according to claim 14, further comprising stowing the probe in the wing main element.

20. The method according to claim 19, wherein the stowing step is initiated by a pilot of the aircraft.

21. The method according to claim 20, wherein the stowing step is initiated automatically in response to a flight condition of the aircraft.

22. A system for detecting presence of debris on an aircraft wing comprising a leading edge and a Krueger flap coupled to the leading edge, the system comprising:
   a probe coupled to the aircraft wing, the probe having a measurement tip;
   a deployment mechanism coupled to the probe and configured to move the probe upon deployment of the Krueger flap such that the measurement tip of the probe extends between a gap formed between the Krueger flap and the leading edge, and to bias the measurement tip toward the leading edge until travel of the measurement tip is limited and the measurement tip reaches a measurement position; and
   a sensing architecture coupled to the probe and configured to compare the measurement position to an expected debris-free position.

23. The system according to claim 22, wherein the sensing architecture is configured to indicate the presence of debris on the leading edge when the measurement position deviates from the expected debris-free position by at least a threshold amount.

* * * * *